United States Patent
Yoneno

(10) Patent No.: US 12,019,362 B2
(45) Date of Patent: Jun. 25, 2024

(54) PROJECTION SYSTEM

(71) Applicant: SEIKO EPSON CORPORATION, Tokyo (JP)

(72) Inventor: Kunio Yoneno, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/953,497

(22) Filed: Sep. 27, 2022

(65) Prior Publication Data

US 2023/0114660 A1 Apr. 13, 2023

(30) Foreign Application Priority Data

Sep. 30, 2021 (JP) ................. 2021-160801

(51) Int. Cl.
| | |
|---|---|
| G03B 21/608 | (2014.01) |
| G03B 21/28 | (2006.01) |
| G03B 21/60 | (2014.01) |
| H04N 9/31 | (2006.01) |

(52) U.S. Cl.
CPC ............. *G03B 21/60* (2013.01); *G03B 21/28* (2013.01); *H04N 9/3147* (2013.01)

(58) Field of Classification Search
CPC ..... G03B 21/608; H04N 9/3147; G02B 30/56
See application file for complete search history.

(56) References Cited

U.S. PATENT DOCUMENTS

| | | | |
|---|---|---|---|
| 2004/0001182 A1 | 1/2004 | Dyner | |
| 2013/0003020 A1* | 1/2013 | Koehler | H04N 13/363 353/7 |
| 2014/0092366 A1* | 4/2014 | Chen | G03B 21/14 353/20 |
| 2017/0146898 A1 | 5/2017 | Mizuno | |
| 2022/0319360 A1* | 10/2022 | Li | G02B 30/56 |

FOREIGN PATENT DOCUMENTS

| | | |
|---|---|---|
| JP | 2005-531812 A | 10/2005 |
| JP | 2008-033202 A | 2/2008 |
| JP | 2013-017161 A | 1/2013 |
| JP | 2016-024397 A | 2/2016 |
| JP | 2016-197192 A | 11/2016 |

* cited by examiner

*Primary Examiner* — Ryan D Howard
(74) *Attorney, Agent, or Firm* — Dority & Manning, P.A.

(57) ABSTRACT

A projection system according to the present disclosure includes an image projection section projecting a first image light and a second image light to directions different from each other so that the first image light overlaps the second image light in a first region, and a fog screen production section producing a fog screen in which a plurality of particles that reflect the first image light and the second image light are dispersed in a screen region containing the first region.

11 Claims, 11 Drawing Sheets

PROJECTION SYSTEM

The present application is based on, and claims priority from JP Application Serial Number 2021-160801, filed Sep. 30, 2021, the disclosure of which is hereby incorporated by reference herein in its entirety.

BACKGROUND

1. Technical Field

The present disclosure relates to a projection system.

2. Related Art

Recently, various kinds of research in stereoscopic images and three-dimensional displays have been advanced. As an example, a technique of producing a stereoscopic screen by placing particles reflecting or scattering light in a fog form in a space and displaying pseudo stereoscopic images on the stereoscopic fog screen is proposed. For example, JP-A-2008-033202 discloses a picture display apparatus (projection system) producing a fog screen in the air and projecting pictures on the fog screen as three-dimensional pictures.

In the picture display apparatus disclosed in JP-A-2008-033202, many fog ejection portions are placed in a fog ejection portion fixing body, an amount of particles ejected from these fog ejection portions or the like is controlled according to characteristics of images to be projected onto the fog screen, and, for example, a rod-shaped or filmy fog screen not excessively thick is produced. However, in the picture display apparatus disclosed in JP-A-2008-033202, a light containing a picture is radiated from the projector toward the fog screen from a single direction and the entire radiated light is excessively diffused by the fog screen and appears as a simple bundle of rays, and visibility of the picture may be lower.

SUMMARY

In order to solve the above described problem, a projection system according to an aspect of the present disclosure includes an image projection section projecting a first light containing a first image light and a second light containing a second image light from directions different from each other, and a fog screen production section generating a fog screen in which a plurality of particles that can reflect the first light and the second light are dispersed in a screen region containing a predetermined region, wherein the image projection section projects the first light and the second light so that the first image light and the second image light overlap in a predetermined first region.

DESCRIPTION OF EXEMPLARY EMBODIMENTS

First Embodiment

As below, a first embodiment of the present disclosure will be explained using FIGS. 1 to 9.

Figure 1:
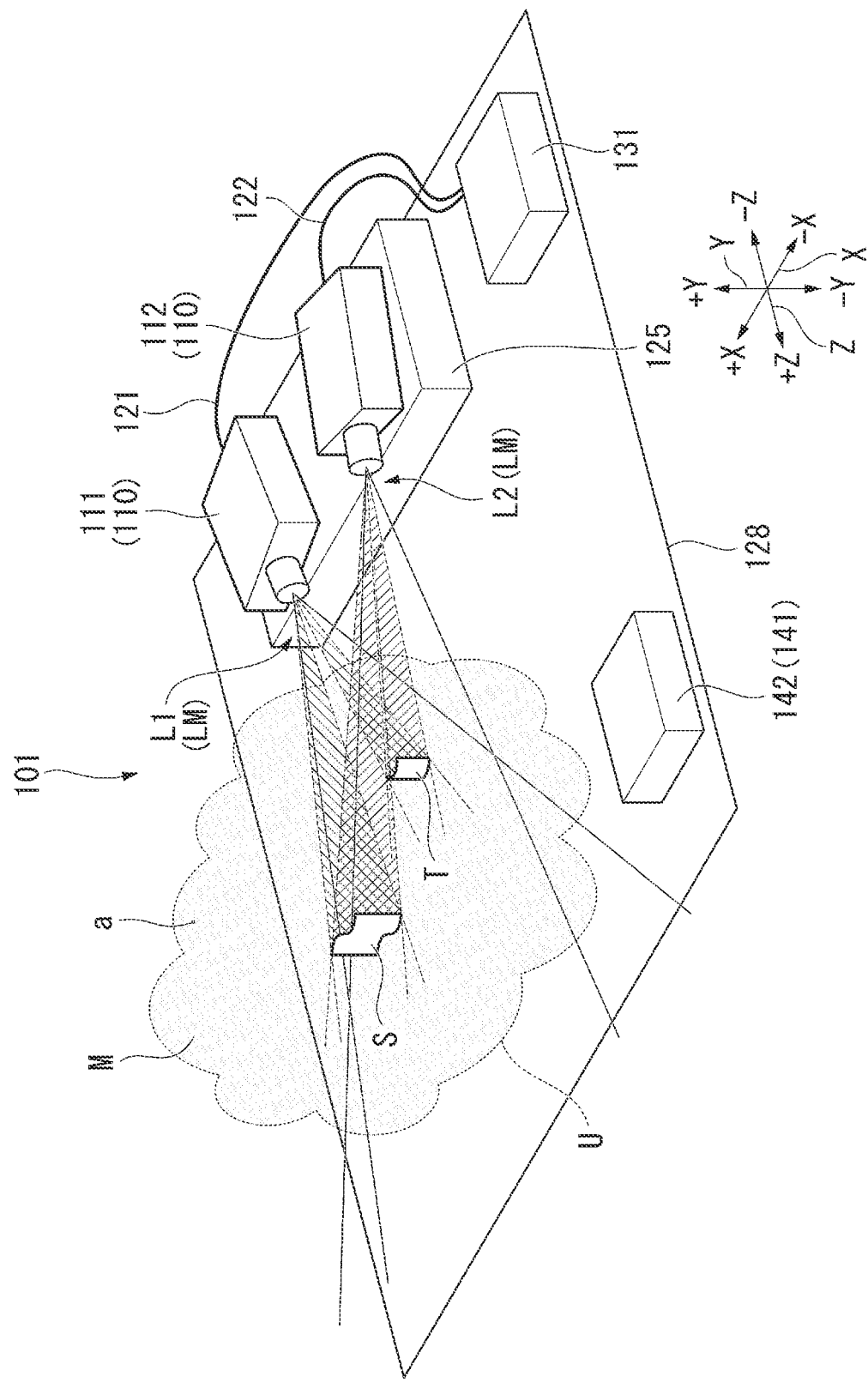
FIG. 1 is a schematic configuration diagram of a projection system of a first embodiment.

FIG. 1 is a perspective view of a projection system 101 of the first embodiment. In the following respective drawings, for clear views of the respective component elements, scales of dimensions may be changed depending on the component elements.

The projection system 101 is a display apparatus projecting an image light containing an image using a projector on fog as a screen and generating a picture observable by diffusion of the image light by the fog, and is used for e.g. a display apparatus for signage, a display apparatus used in an event, picture equipment for special effects, or the like.

Figure 2:
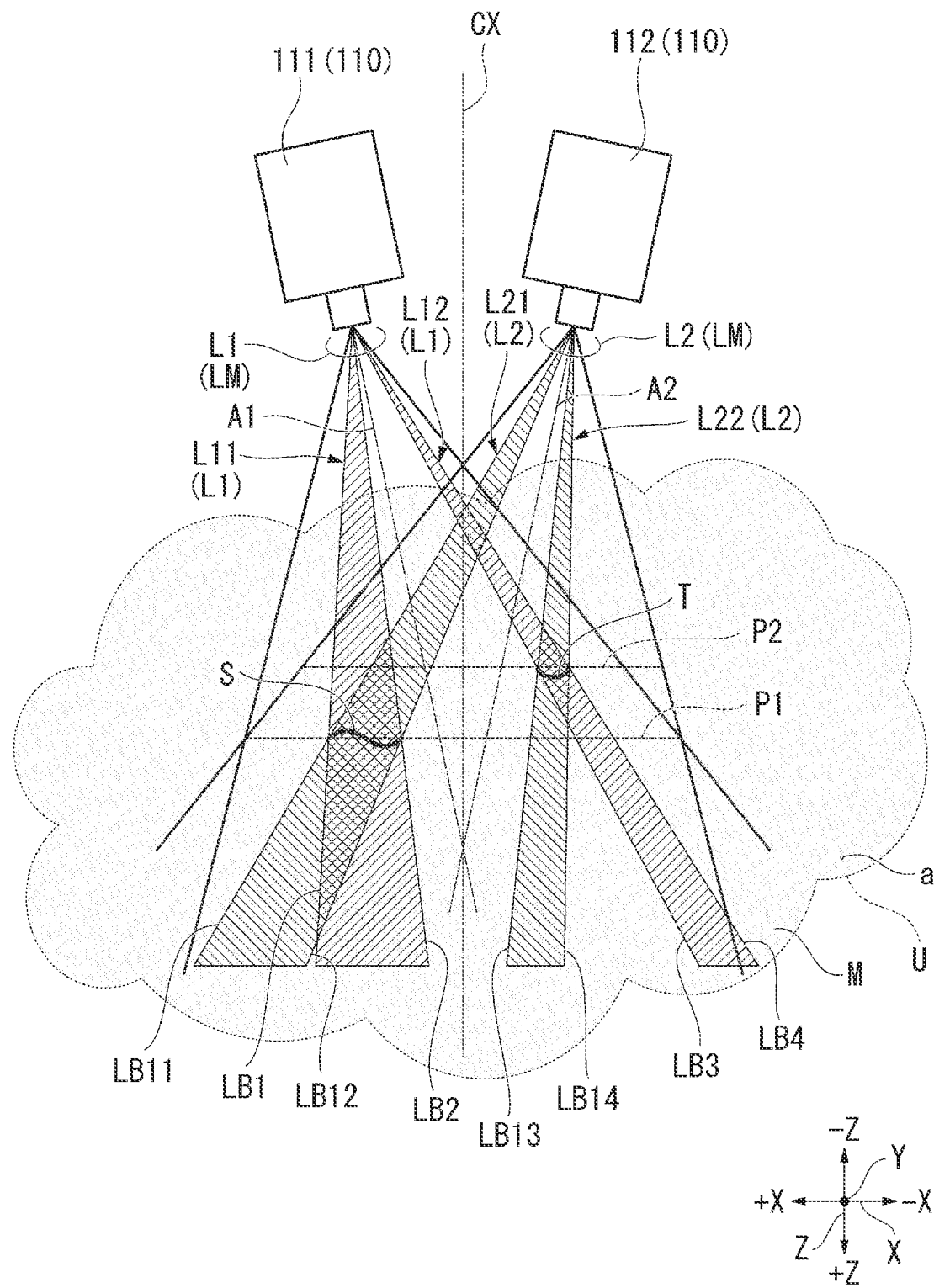
FIG. 2 is a plan view for explanation of an overlap between a first image light and a second image light in the projection system shown in FIG. 1.

As shown in FIGS. 1 and 2, the projection system 101 includes at least an image projection section 110 and a fog screen production section 141, and further includes an installation base 125 and a signal processing device 131. The image projection section 110 projects a first light L1 containing an image light and a second light L2 containing an image light from directions different from each other so that the lights may overlap with each other in predetermined regions P1, P2. The first light L1 contains at least a first image light L11 and a third image light L12, and the second light L2 contains at least a second image light L21 and a fourth image light L22. In the first embodiment, the image projection section 110 has a first projector (first projection unit) 111 projecting the first light L1 and a second projector (second projection unit) 112 projecting the second light L2. The first projector 111 and the second projector 112 are placed on the installation base 125 on an installation surface 128 and coupled to the signal processing device 131 via signal lines 121, 122.

As below, in the projection system 101, directions parallel to a reference axis CX in which an image light LM containing the first light L1 and the second light L2 is output from the image projection section 110 are referred to as "Z directions", and one side in the Z direction, i.e., a side relatively closer to the image projection section 110 is referred to as "−Z side" and the other side in the Z direction, i.e., a side relatively farther from the image projection section 110 is referred to as "+Z side". Directions along the installation surface 128 on which the image projection section 110 is installed and orthogonal to the Z directions are referred to as "X directions", and relatively one side in the X direction is referred to as "+X side" and relatively the other side in the X direction is referred to as "−X side". Directions orthogonal to the X directions and the Z directions are referred to as "Y directions", and relatively one side in the Y direction is referred to as "+Y side" and relatively the other side in the Y direction is referred to as "−Y side".

The fog screen production section 141 produces a fog screen M in a region (screen region) U containing the predetermined regions P1, P2 in which the first light L1 and the second light L2 overlap with each other. In the fog screen M, a plurality of particles a are dispersed in a fog form. The fog screen production section 141 includes a fog generation device 142 that can inject the particles a of water droplets or the like toward the region U. The fog generation device 142 is placed in a position overlapping with the substantially center position of the region U in the Z directions on the installation surface 128 at the −X side or the +X side beyond the region U. In the projection system 101, picture signals are respectively input to the first projector 111 and the second projector 112 from the signal processing device 131, the first light L1 and the second light L2 according to the respective picture signals are projected from the first projector 111 and the second projector 112 toward the fog screen M, and images S, T are formed within the fog screen M. The signal processing device 131 is a control section controlling image projection in the respective first projector 111 and second projector 112 and corresponds to "control section" in Claims.

Figure 3:
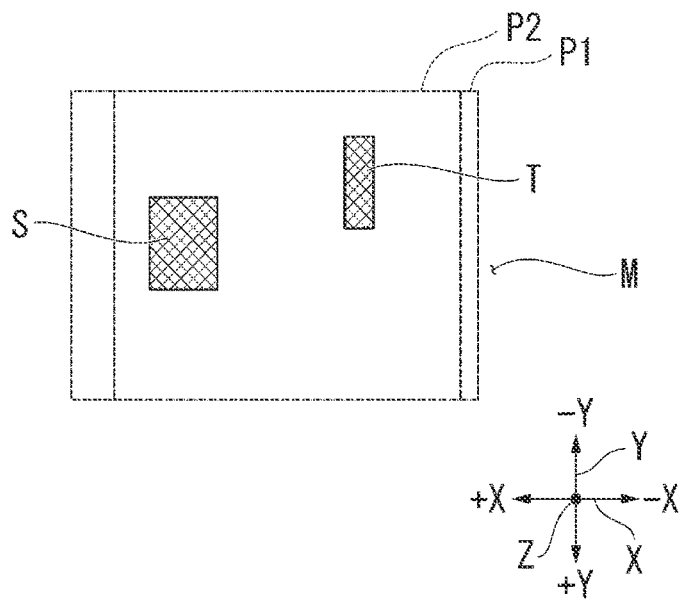
FIG. 3 is a schematic diagram of images observed in the projection system shown in FIG. 1.

FIG. 2 is a plan view for explanation of an overlap between the first light L1 and the second light L2 in the projection system 101. FIG. 3 is a front view of the images S, T projected in the projection system 101. As shown in FIG. 2, the first light L1 and the second light L2 are projected from the image projection section 110 to overlap with each other in the respective predetermined regions P1, P2 from the directions different from each other.

In the first embodiment, an optical axis A1 of the first light L1 projected from the first projector 111 and an optical axis A2 of the second light L2 projected from the second projector 112 cross within the XZ-plane along the X directions and the Z directions. The first light L1 is projected from an exit opening of the first projector 111 into a range of a predetermined radiation angle around the optical axis A1 and a projection region according to the range of the radiation angle. The second light L2 is projected from an exit opening of the second projector 112 into a range of a predetermined radiation angle around the optical axis A2 and a projection region according to the range of the radiation angle. The optical axis A1 of the first light L1 and the optical axis A2 of the second light L2 projected by the first projector 111 and the second projector 112, respectively, tilt relative to each other on the installation surface 128 parallel to the XZ-plane and also tilt relative to the Z directions. Note that, regarding a picture projected by the first light L1 and a picture projected by the second light L2, when the same picture signals with each other are input from the signal processing device 131 to the first projector 111 and the second projector 112, sizes and distortions are corrected by the picture signals from the signal processing device 131 so that the pictures may be aligned with each other in the region containing the predetermined regions P1, P2 in which the first light L1 and the second light L2 overlap with each other. Further, regarding the picture projected by the first light L1 and the picture projected by the second light L2, focuses of projection lenses of the first projector 111 and the second projector 112 are adjusted so that the respective pictures may be in focus in a good condition in the region containing the predetermined regions P1, P2, in which the first light L1 and the second light L2 overlap with each other.

When the first projector 111 and the second projector 112 have shift functions or rotation functions within the XZ-plane, the first projector 111 and the second projector 112 may be placed to erect relative to the installation surface 128, the first light L1 and the second light L2 may be shifted obliquely in the Y directions and overlap with each other in the predetermined regions P1, P2, and the images S, T may be formed to be aligned. The predetermined region P2 is positioned in a location closer to the image projection section 110 than the predetermined region P1. Therefore, the image T is formed in a position closer to the image projection section 110 than the image S. That is, the respective distances from the image projection section 110 to the images S, T are different. The respective sizes of the images S, T are different. The predetermined region P1 corresponds to "first region" in Claims and the predetermined region P2 corresponds to "second region" in Claim. The image S corresponds to "an image formed in the first region" in Claims and the image T corresponds to "an image formed in the second region" in Claims, respectively.

In the first embodiment, the images, i.e., the projected images exist only in the first image light L11 within a range between beams LB1, LB2 and the third image light L12 within a range between beams LB3, LB4 of the predetermined radiation angle range of the first light L1 output from the exit opening of the first projector 111. Further, the images, i.e., the projected images exist only in the second image light L21 within a range between beams LB11, LB12 and the fourth image light L22 within a range between beams LB13, LB14 of the predetermined radiation angle range of the second light L2 output from the exit opening of the second projector 112. In the respective drawings, of the first light L1 and the second light L2, the ranges in which the projected images exist are shown by hatched lines.

The fog screen M contains the predetermined regions P1, P2 in which at least the first light L1 and second light L2 overlap with each other. In the fog screen M, the first image light L11, the third image light L12 and the second image light L21, the fourth image light L22 are each reflected in all directions by the particles a and diffused and appear brighter like a bundle of rays than the surrounding part. A region in a nearly rhombic shape where the first image light L11 and the second image light L21 overlap with each other within the fog screen M appears even brighter than the respective first image light L11 and second image light L21 diffused in the fog screen M. In the nearly rhombic region, the image S in which an image contained in the first image light L11 and an image contained in the second image light L21 coincide with each other is formed to be brighter and clearer in the predetermined region P1 in the Z directions. Similarly, a region in a nearly rhombic shape where the third image light L12 and the fourth image light L22 overlap with each other within the fog screen M appears even brighter than the respective third image light L12 and fourth image light L22 diffused on the fog screen M. In the nearly rhombic region, the image T in which an image contained in the third image light L12 and an image contained in the fourth image light L22 coincide with each other is formed to be brighter and clearer in the predetermined region P2 in the Z directions.

In FIG. 2, there is the single region in the nearly rhombic shape where the third image light L12 and the second image light L21 overlap with each other within the fog screen M, however, the picture signals respectively output from the signal processing device 131 to the first projector 111 and the second projector 112 are switched in time sequence, and thereby, no bright image is formed in the nearly rhombic region where the third image light L12 and the second image light L21 overlap with each other. That is, the on-states of the first image light L11, the third image light L12 and the second image light L21, the fourth image light L22 are controlled by the signal processing device 131 so that, of a combination of the first image light L11 and the second image light L21 and a combination of the third image light L12 and the fourth image light L22, one combination may be in the on-state and the other combination may be in the off-state.

From observation at the +Z side beyond the predetermined region P1 along the Z direction toward the −Z side, as shown in FIG. 3, the bright image S is visually recognized within the predetermined region P1 and the bright image T is visually recognized within the predetermined region P2 within the fog screen M. The images S, T are formed within the regions in which the predetermined regions P1, P2 overlap with each other in the X directions and visually recognized substantially within the same field of view. As described above, the on-states of the first image light L11, the third image light L12 and the second image light L21, the fourth image light L22 are controlled by the signal processing device 131 to be switched in time sequence, and thereby, strictly, the images S, T are alternately formed and visually recognized. Note that, for example, the speed of switching of the on-states of the first image light L11, the third image light L12 and the second image light L21, the fourth image light L22 is lower than the so-called video rate, an observer (not shown) visually recognizes the images S, T substantially at the same time.

Figure 4:
FIG. 4 is a schematic diagram for explanation of an appearance of the image formed in a predetermined region of the projection system shown in FIG. 1.
Figure 5:
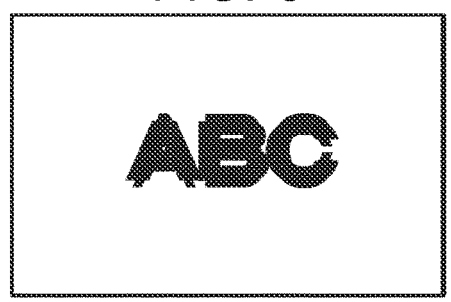
FIG. 5 is a schematic diagram for explanation of an appearance of the image formed in the predetermined region of the projection system shown in FIG. 1.
Figure 6:
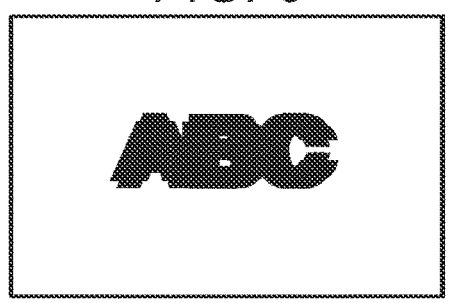
FIG. 6 is a schematic diagram for explanation of an appearance of the image formed in the predetermined region of the projection system shown in FIG. 1.
Figure 7:
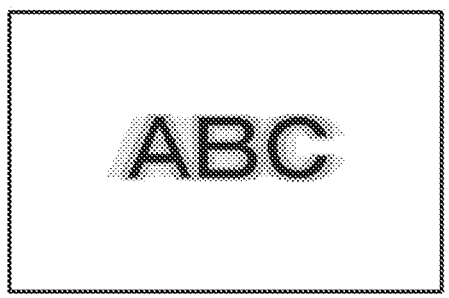
FIG. 7 is a schematic diagram for explanation of an appearance of the image formed in the predetermined region of the projection system shown in FIG. 1.

FIGS. 4 to 7 are respectively schematic diagrams showing appearances of the image S in the predetermined region P1. FIG. 4 is a schematic diagram of an example of an image of the first image light L11, the third image light L12 and the second image light L21, the fourth image light L22 projected in the predetermined region P1 or region P2. FIG. 5 is a schematic diagram showing an image by the first image light L11 projected on the image S in the predetermined region P1. FIG. 6 is a schematic diagram showing an image by the second image light L21 projected on the image S in the predetermined region P1. FIG. 7 is a schematic diagram for explanation of changes in brightness of the image S in the predetermined region P1. From observation of the part around the image S from on the reference axis CX in the nearly middle position in the X directions between the exit opening of the first projector 111 and the exit opening of the second projector 112 along the Z direction, as shown in FIG. 5, the image by the first image light L11 from the first projector 111 spreads the original image "ABC" shown in FIG. 4 toward both the ±X sides and the ±Y sides. Similarly, from observation of the part around the image S from on the reference axis CX along the Z direction, the image by the second image light L21 from the second projector 112 is radiated to the region in which the image S is formed from the oblique direction relative to the first image light 11, and accordingly, as shown in FIG. 6, the image spreads further toward the ±X sides than the image by the first image light L11. As a result of these phenomena, in the nearly rhombic region where the first image light L11 and the second image light L21 overlap with each other within the fog screen M, as shown in FIG. 7, the image S is formed with brightness changing in a stepwise manner in each of the X directions and the Y directions according to the degree of the overlap between the first image light L11 and the second image light L21. Further, the parts in which the image by the first image light L11 and the image by the second image light L21 overlap at the highest degree, i.e., the parts shown in black in FIG. 7 appear brightest.

Regarding the image T, like the above described appearances of the image S, the brightness changes in a stepwise manner in each of the X directions and the Y directions according to the degree of the overlap between the third image light L12 and the fourth image light L22, and the parts in which the image by the third image light L12 and the image by the fourth image light L22 overlap at the highest degree appear brightest. The images S, T are visually recognized as being floating within the fog screen M.

The distortions of the picture signals of the second image light L21, the first image light L11, the third image light L12, and the fourth image light L22 are corrected by the signal processing device 131. Further, different corrections are respectively performed on the first image light L11, the third image light L12 and the second image light L21, the fourth image light L22 in the X directions, and thereby, the images S, T can be formed on curved surfaces curved relative to the X directions and may be formed on planar surfaces substantially parallel to the X directions.

Figure 8:
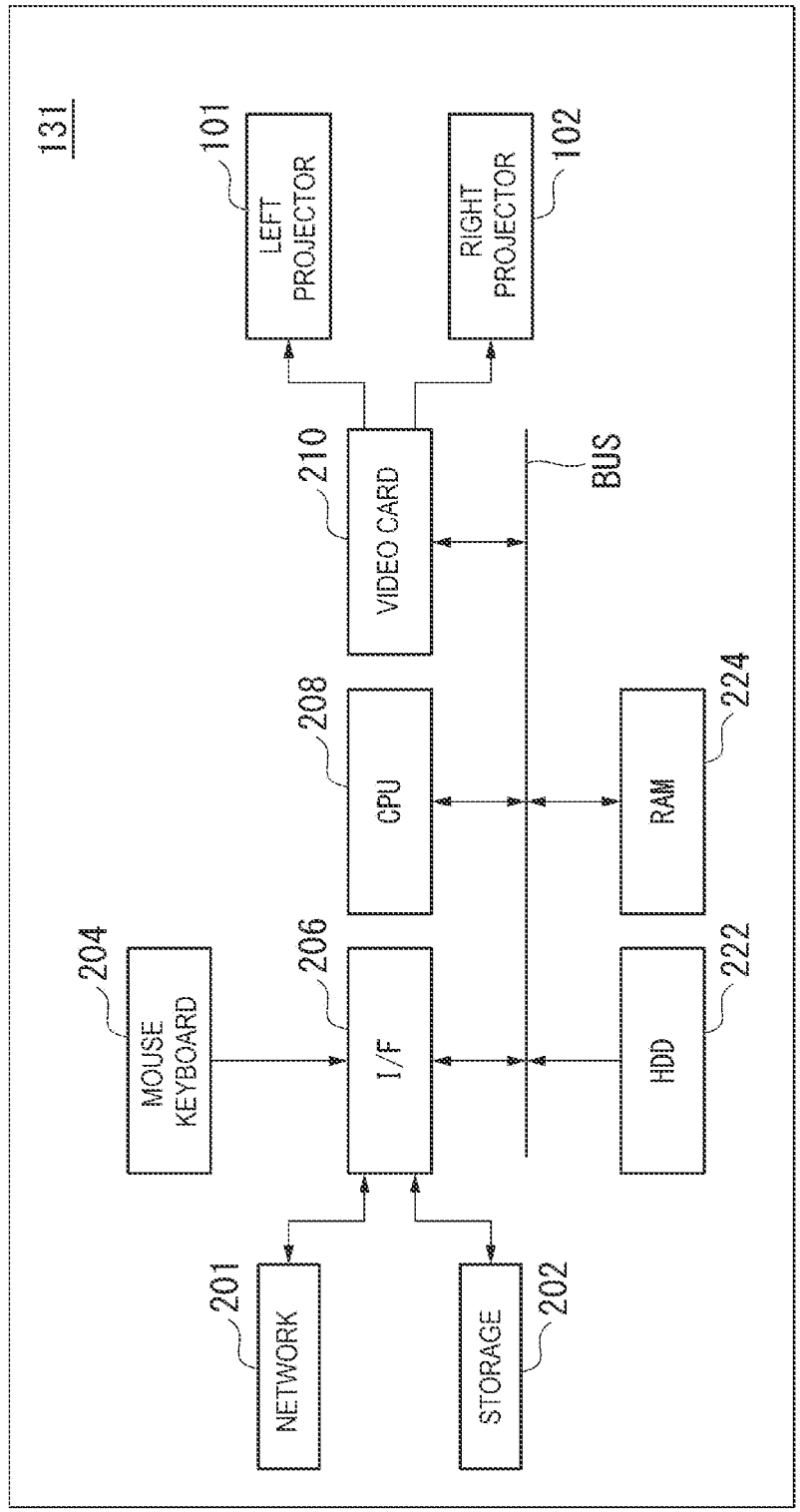
FIG. 8 is a block diagram of a signal processing device of the projection system shown in FIG. 1.

FIG. 8 is a block diagram showing an example of a configuration of the signal processing device 131 shown in FIG. 1. As shown in FIG. 8, in the signal processing device 131, an interface 206, a CPU (Central Processing Unit) 208, an HDD (Hard Disk Drive) 222, a RAM (Random Access Memory) 224, and a video card 210 are coupled to a common bus BUS. To the interface 206, e.g. a network 201, a storage 202, an input device 204 such as a mouse and a keyboard are coupled. From the video card 210, the picture signals to the respective first projector 111 and second projector 112 are output. The picture signals to the respective first projector 111 and second projector 112 may be read from outside via the network 201 or a separate network (not shown) or stored in the storage 202 in advance.

As described above, the distortions of the picture projected by the first light L1 and the picture projected by the second light L2 are corrected by the picture signals from the signal processing device 131, and the picture signals for the distortion correction are processed by software written in the HDD 222.

Figure 9:
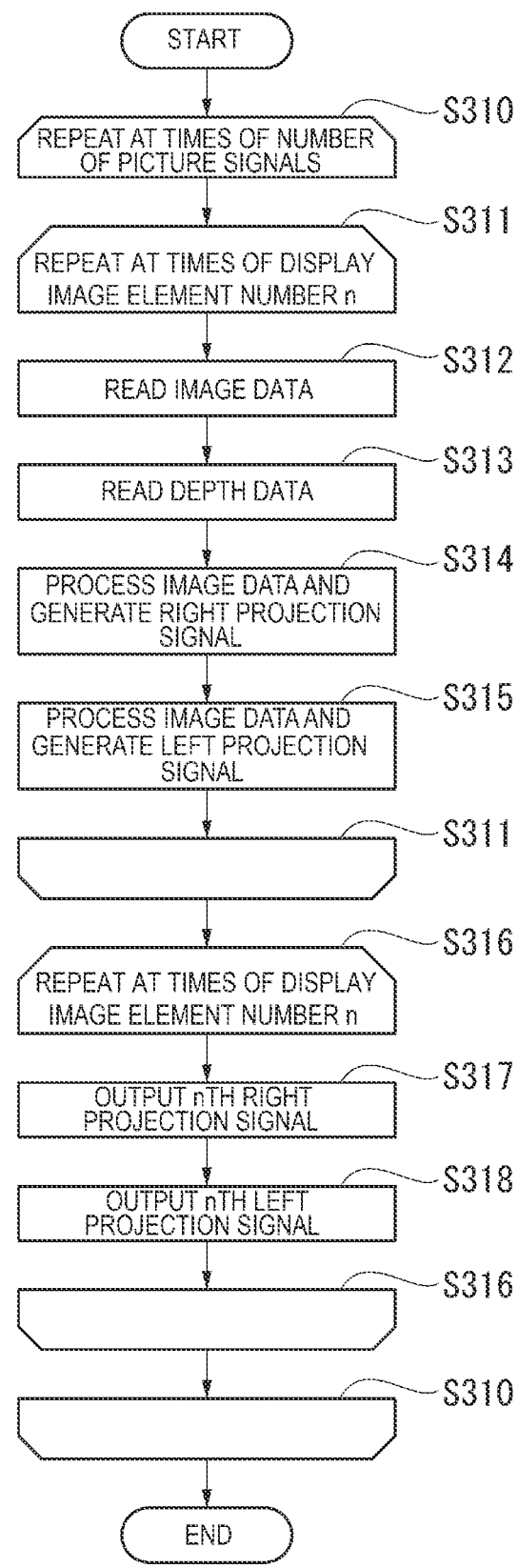
FIG. 9 is a flowchart of an example of processing of picture signals in the projection system shown in FIG. 1.

FIG. 9 is a flowchart of an outline of processing of generating the picture signals input to the first projector 111 and the second projector 112 of the image projection section 110. When the number of displayed images is a display image element n, n=2 in the first embodiment. As shown in FIG. 9, first, for n=1, image data and depth data of a first image S to be displayed are read (steps S312, S313). The image data represents a light intensity distribution on the XY-plane along the X directions and Y directions. The depth data represents a light intensity distribution showing changes in the Z directions, i.e., curves on the XY-plane. Then, the read image data is processed and combined with the depth data, and the picture signal to be input to the first projector 111 as a right projection signal is generated (step S314) and the picture signal to be input to the second projector 112 as a left projection signal is generated (step S315). In this manner, the generation of the respective right projection signal and left projection signal is repeatedly performed for the display image element n (step S311).

Note that the position where the respective right projection signal and left projection signal for each display image element n overlap with each other in the X directions may be calculated from an angle formed by the optical axis A1 of the first light L1 output from the first projector 111 relative to the Z directions and a radiation angle distribution of the first light L1 and an angle formed by the optical axis A2 of the second light L2 output from the second projector 112 relative to the Z directions and a radiation angle distribution of the second light L2. Further, the position where the respective right projection signal and left projection signal overlap with each other in the X directions may be directly calculated from angles formed by the respective optical axes of the first image light L11 and the third image light L12 output from the first projector 111 relative to the Z directions and angles formed by the respective optical axes of the second image light L21 and the fourth image light L22 output from the second projector 112 relative to the Z directions.

Then, the right projection signal generated in the above described manner is output toward the fog screen M as the picture signal from the first projector 111, i.e., the first light L1 (step S317). Further, the left projection signal generated in the above described manner is output toward the fog screen M as the picture signal from the second projector 112, i.e., the second light L2 (step S318). When n=1, that is, when the first image light L11 is output in the first light L1, the third image light L12 corresponding to n=2 is not output. When n=1, that is, when the second image light L21 is output in the second light L2, the first image light L11 for the same n=1 is output, but the fourth image light L22 corresponding to n=2 is not output. In other words, the on-states of the first image light L11 and the second image light L21 forming the image S and the on-states of the third image light L12 and the fourth image light L22 forming the image T are alternately switched with a predetermined time period. The respective on-states are switched with the predetermined time period as described above, and thereby, the bright image S is formed in the predetermined region P1 and the bright image T is formed in the predetermined region P2 of the fog screen M. However, appearances of images in the regions not required to be displayed on the fog screen M are avoidable because no image is formed in another region where two lights of the first image light L11, the third image light L12 and the second image light L21, the fourth image light L22 overlap than the predetermined regions P1, P2 on the fog screen M. As described above, the output of the respective right projection signal and left projection signal is repeatedly performed for the display image element n (step S316).

The entire processing of the above described generation steps S311 to S315 of the right projection signal and the left projection signal and output steps S316 to S318 of the right projection signal and the left projection signal is repeated at the times of the number of picture signals, i.e., the number of images (step S310).

The above described projection system 101 of the first embodiment includes the image projection section 110 projecting the first light L1 and the second light L2 from different directions from each other so that the lights may overlap with each other in the predetermined regions P1, P2, and the fog screen production section 141 producing the fog screen M in which the plurality of the particles a that can reflect the first light L1 and the second light L2 toward the region U containing the predetermined regions P1, P2 are dispersed. According to the projection system 101 of the first embodiment, the first light L1 and the second light L2 containing the picture signals are radiated from the image projection section 110 toward the fog screen M from the different directions from each other, i.e., two directions, and thereby, the brighter images S, T than the surrounding fog screen M or the first light L1 or the second light L2 diffused as a single element in the fog screen M may be formed in the predetermined regions P1, P2 where the first light L1 and the second light L2 overlap. The observer may observe the brighter images S, T than those in related art. According to the projection system 101 of the first embodiment, visibility of the pictures may be increased.

In the projection system 101 of the first embodiment, the first light L1 and the second light L2 are radiated to the predetermined regions P1, P2 of the fog screen M from the two directions different from each other, and thereby, compared to a case where an image light containing a picture is radiated from a single direction like the case of related art, the images S, T are diffused at wider angles within the XZ-plane. According to the projection system 101 of the first embodiment, the images S, T may be observed from a wider observation range at a wider angle compared to those in the apparatus of related art. Further, according to the projection system 101 of the first embodiment, the particle size and the dispersion amount of the particles a in the fog screen M are adjusted by the fog screen production section 141, and thereby, the degree of visibility and the observation range of the images S, T may be appropriately controlled and effective projection may be realized. The projection system 101 of the first embodiment is preferable for use in outdoor projection, a wide range of stage production, or the like.

In the projection system 101 of the first embodiment, the image projection section 110 has the first projector 111 projecting the first light L1 and the second projector 112 projecting the second light L2. According to the projection system 101 of the first embodiment, the first light L1 and the second light L2 are respectively projected from the individual projectors (projection units), and thereby, the total amount of light radiated to the predetermined regions P1, P2 may be increased and the brighter images S, T may be formed. Further, according to the projection system 101 of the first embodiment, the first light L1 and the second light L2 may be individually controlled. For example, the respective radiation angle distributions of the first image light L11, the third image light L12 in the first light L1 and the respective radiation angle distributions of the second image light L21, the fourth image light L22 in the second light L2 may be finely controlled and set.

Second Embodiment

Next, a projection system of a second embodiment of the present disclosure will be explained using FIG. 10.

In a projection system 102 of the second embodiment, the configurations in common with the projection system 101 of the first embodiment have the same signs as those of the configurations of the projection system 101 and the explanation thereof will be omitted.

Figure 10:
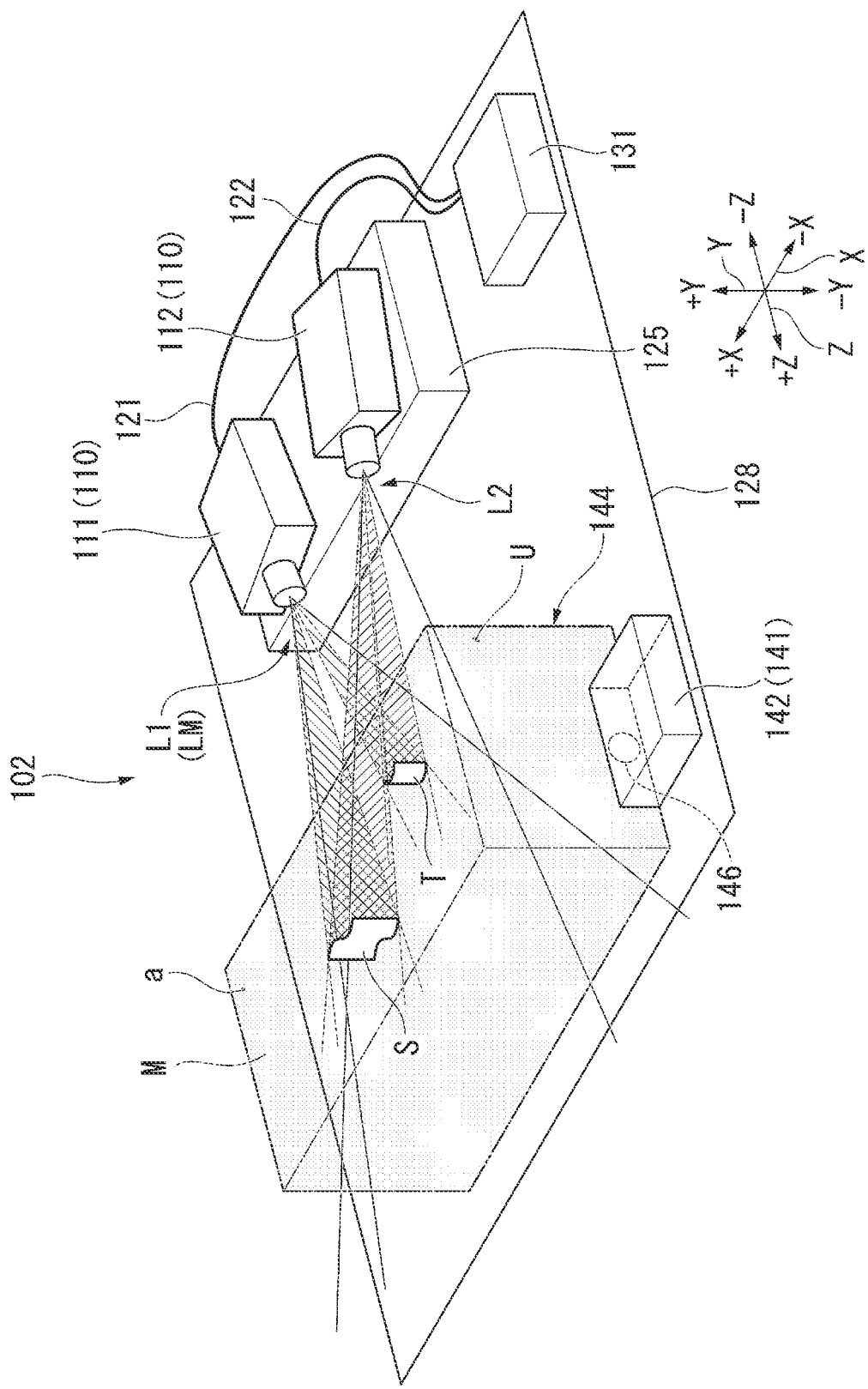
FIG. 10 is a schematic configuration diagram of a projection system of a second embodiment.

FIG. 10 is a perspective view of the projection system 102 of the second embodiment. As shown in FIG. 10, the projection system 102 includes the image projection section 110 having the first projector 111 and the second projector 112, the fog screen production section 141, a transparent box 144, the installation base 125, and the signal processing device 131. In the projection system 102, the transparent box 144 surrounding the region U containing the predetermined regions P1, P2 (not shown in FIG. 10, see FIG. 2) is provided. The transparent box 144 is formed using a material that can transmit at least part of the first light L1 and the second light L2 and has transparency in a visible wavelength range. The total light transmittance of the transparent box 144 for the first light L1 and the second light L2 is e.g. 70% or more and preferably 90% or more. The transparent box 144 is formed using e.g. optical glass or transparent resin.

A fog injection entrance 146 is formed in the transparent box 144. To the fog injection entrance 146, a fog injection opening (not shown) of the fog generation device 142 of the fog screen production section 141 is coupled. Inside of the transparent box 144, a plurality of particles a injected from the fog generation device 142 are dispersed and the box is filled with fog. That is, in the projection system 102, the fog screen M having the same stereoscopic shape as the transparent box 144 is formed. The images S, T are formed in the fog screen M filling the interior of the transparent box 144.

In the above described projection system 102 of the second embodiment, like the projection system 101 of the first embodiment, the first light L1 and the second light L2 containing the picture signals are radiated from the image projection section 110 toward the fog screen M from the two directions different from each other. Therefore, according to the projection system 102 of the second embodiment, the brighter images S, T than the surrounding fog screen M or the first light L1 or the second light L2 diffused as a single element in the fog screen M may be formed in the predetermined regions P1, P2 where the first light L1 and the second light L2 overlap and the visibility of the pictures may be increased. Further, according to the projection system 102 of the second embodiment, the first light L1 and the second light L2 are individually projected from the first projector 111 and the second projector 112, and thereby, the respective first image light L11, third image light L12 and second image light L21, fourth image light L22 may be accurately controlled and the appearances and the degrees of visibility of the images S, T may be adjusted.

Furthermore, in the projection system 102 of the second embodiment, the transparent box 144 is provided, the transparent box 144 is filled with the fog generated from the fog generation device 142, and the images S, T are formed in the predetermined regions P1, P2 of the fog screen M filling the interior of the transparent box 144. According to the projection system 102 of the second embodiment, the amount of generated fog may be suppressed to nearly the same as the capacity of the transparent box 144 and use efficiency of the generated fog may be increased. Further, according to the projection system 102 of the second embodiment, the fog screen M may be surrounded by the transparent box 144, fluctuations of the fog screen M and influences on the images S, T by wind, environmental factors, or the like may be avoided, and lowering of the degree of visibility of the images S, T may be suppressed.

Note that, regarding the projection system 102 of the second embodiment, the transparent box 144 having a rectangular parallelepiped shape is exemplified in FIG. 10, however, the shape of the transparent box 144 is not limited to the rectangular parallelepiped shape, but may be e.g. a spherical shape, an ellipsoidal shape, a cylindrical shape, or a polygonal prism shape. In other words, the shape of the transparent box 144 can be appropriately set according to the way of showing the images S, T and the relative position of the observer to the fog screen M.

Third Embodiment

Next, a projection system of a third embodiment of the present disclosure will be explained using FIGS. 11 to 14.

In a projection system 103 of the third embodiment, the configurations in common with the projection system 101 of the first embodiment have the same signs as those of the configurations of the projection system 101 and the explanation thereof will be omitted.

Figure 11:
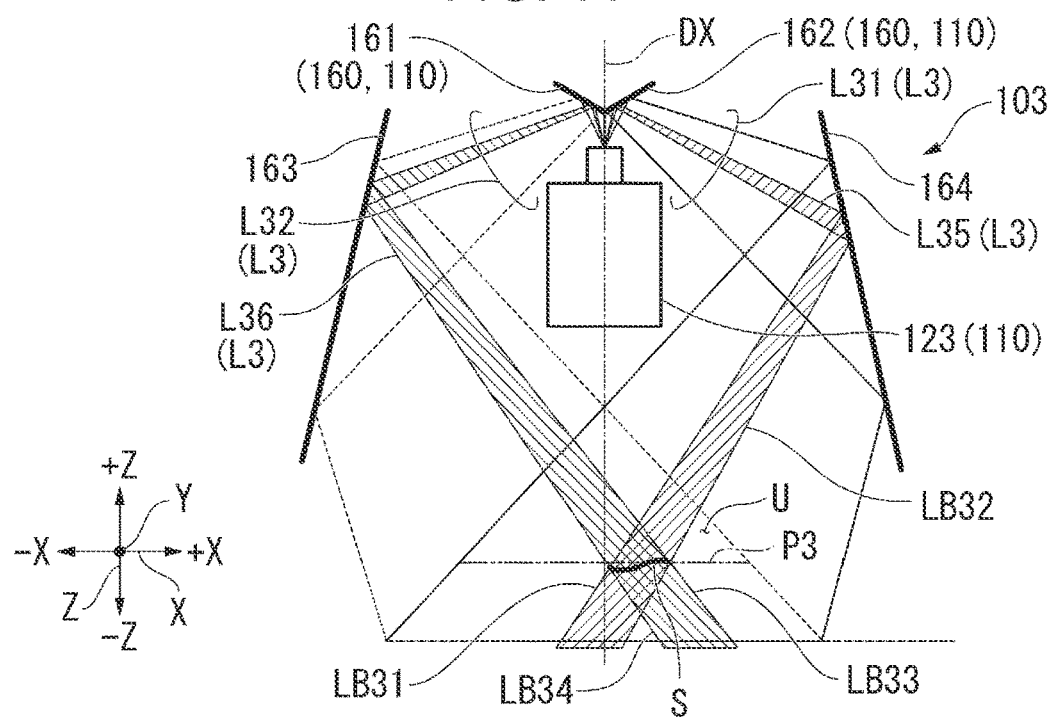
FIG. 11 is a schematic configuration diagram of a projection system of a third embodiment.

FIG. 11 is a plan view of the projection system 103 of the third embodiment. The projection system 103 includes the image projection section 110 having a third projector 123, the fog screen production section 141, the installation base 125, and the signal processing device 131. Note that, in FIG. 11, the fog screen production section 141, the installation base 125, the installation surface 128, and the signal processing device 131 are omitted. As shown in FIG. 11, in the projection system 103, the image projection section 110 has the single third projector (projection unit) 123 and a division unit 160. In the projection system 103, a reference axis DX passes through the center of the third projector 123 in the X directions and is parallel to the Z directions.

The third projector 123 outputs a third light (projection light) L3 and projects the third light L3 toward the predetermined region P1. The division unit 160 is placed at the +Z side of the exit opening of the third light L3 in the third projector 123, that is, placed ahead of the third projector 123 in the traveling direction of the third light L3. The division unit 160 includes mirrors 161, 162, 163, 164. The mirror 161 is placed at a tilt to move to the +Z side from the base point position on the reference axis DX at the +Z side of the exit opening of the third light L3 in the third projector 123 toward the −X side. The mirror 162 is placed at a tilt to move to the +Z side from the base point position on the reference axis DX at the +Z side of the exit opening of the third light L3 in the third projector 123 toward the +X side, coupled to the mirror 161 in the base point position, and formed integrally with the mirror 161.

The third light L3 at the +X side of the reference axis DX of the third light L3 output from the third projector 123 is reflected by the mirror 162 and travels toward the +X side and the −Z side of the mirror 162 as a first light L31. The third light L3 at the −X side of the reference axis DX of the third light L3 output from the third projector 123 is reflected by the mirror 161 and travels toward the −X side and the −Z side of the mirror 161 as a second light L32. That is, the mirrors 161, 162 of the division unit 160 divide the third light L3 into the first light L31 and the second light L32.

The mirror (first reflection portion) 164 is placed at the +X side and the −Z side of the mirror 162 at a tilt to move to the +X side toward the −Z side. The first light L31 reflected by the mirror 162 is reflected toward a predetermined region P3 at the −Z side of the third projector 123 by the mirror 164. The mirror (second reflection portion) 163 is placed at the −X side and the −Z side of the mirror 161 at a tilt to move to the −X side toward the −Z side. The mirrors 161, 163 and the mirrors 162, 164 are placed symmetrically to each other with respect to the reference axis DX. The second light L32 reflected by the mirror 162 is reflected toward the predetermined region P3 by the mirror 164 and overlaps with the first light L31 in the region (screen region) U containing the predetermined region P3.

Figure 12:
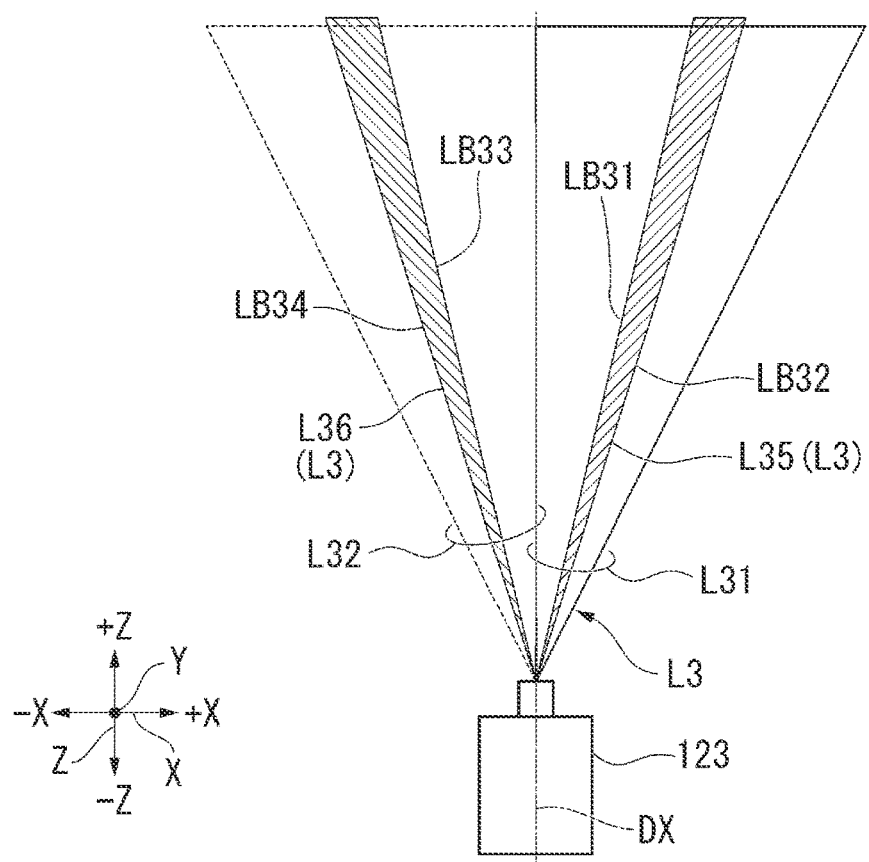
FIG. 12 is a plan view for schematic explanation of the projection system shown in FIG. 11.

FIG. 12 is a plan view showing an outline of a configuration of the third projector 123 and shows the third light L3 when the mirrors 161 to 164 are omitted. As seen from FIGS. 11 and 12, in the third projector 123, the image projection section 110 includes the single projector, and the first light L31 distributed at the +X side of the reference axis DX and the second light L32 distributed at the −X side of the reference axis DX in the X directions are once divided by the mirrors 161, 162 and form a single image at least in the predetermined region P3. In the third projector 123, a single picture signal is projected by the first light L31 and the second light L32 combined with each other in the predetermined region P3. In the region U containing the predetermined region P3, the fog screen M (not shown) is produced.

In the projection system 103, an image, i.e., a projected image exists only in a first image light L35 within a range between beams LB31, LB32 of the predetermined radiation angle range of the first light L31. Further, an image, i.e., a projected image exists only in a second image light L36 within a range between beams LB33, LB34 of the predetermined radiation angle range of the second light L32. In FIGS. 11 and 12, of the first light L31 and the second light L32, the ranges in which the projected images exist are shown by hatched lines. Further, in the projection system 103, the radiation angle distribution of the first light L31 and the radiation angle distribution of the second light L32 are symmetrical to each other with respect to the reference axis DX, however, the relative range of the radiation angle in which the first image light L35 exists in the first light L31 and the relative range of the radiation angle in which the second image light L36 exists in the second light L32 are not symmetrical. Therefore, as shown in FIG. 11, the center position in the X directions in which the image S is formed by an overlap of the first image light L35 and the second image light L36 in the predetermined region P3 does not overlap with the reference axis DX. Specifically, the image S is formed at the +X side of the reference axis DX in the predetermined region P3.

In the projection system 103, the first image light L35 is reflected by the mirrors 162, 164 as described above and the second image light L36 is reflected by the mirrors 161, 163 as described above, and thereby, the image S is formed in the predetermined region P3 within the region U at the −Z side of the third projector 123.

In the projection system 103, both the first image light L35 and the second image light L36 are radiated obliquely at angles to the predetermined region P3 on the XZ-plane. Accordingly, the image S is formed on a curved surface curved relative to the X directions. Note that, like the projection system 101 of the first embodiment, the distortions of the picture signals of the first image light L35 and the second image light L36 are corrected by the signal processing device 131, however, different corrections can be performed in the X directions, and thereby, the image S can be formed on a curved surface curved relative to the X directions. Further, the image S may be formed on a planar surface substantially parallel to the X directions, not curved relative to the X directions.

Figure 13:
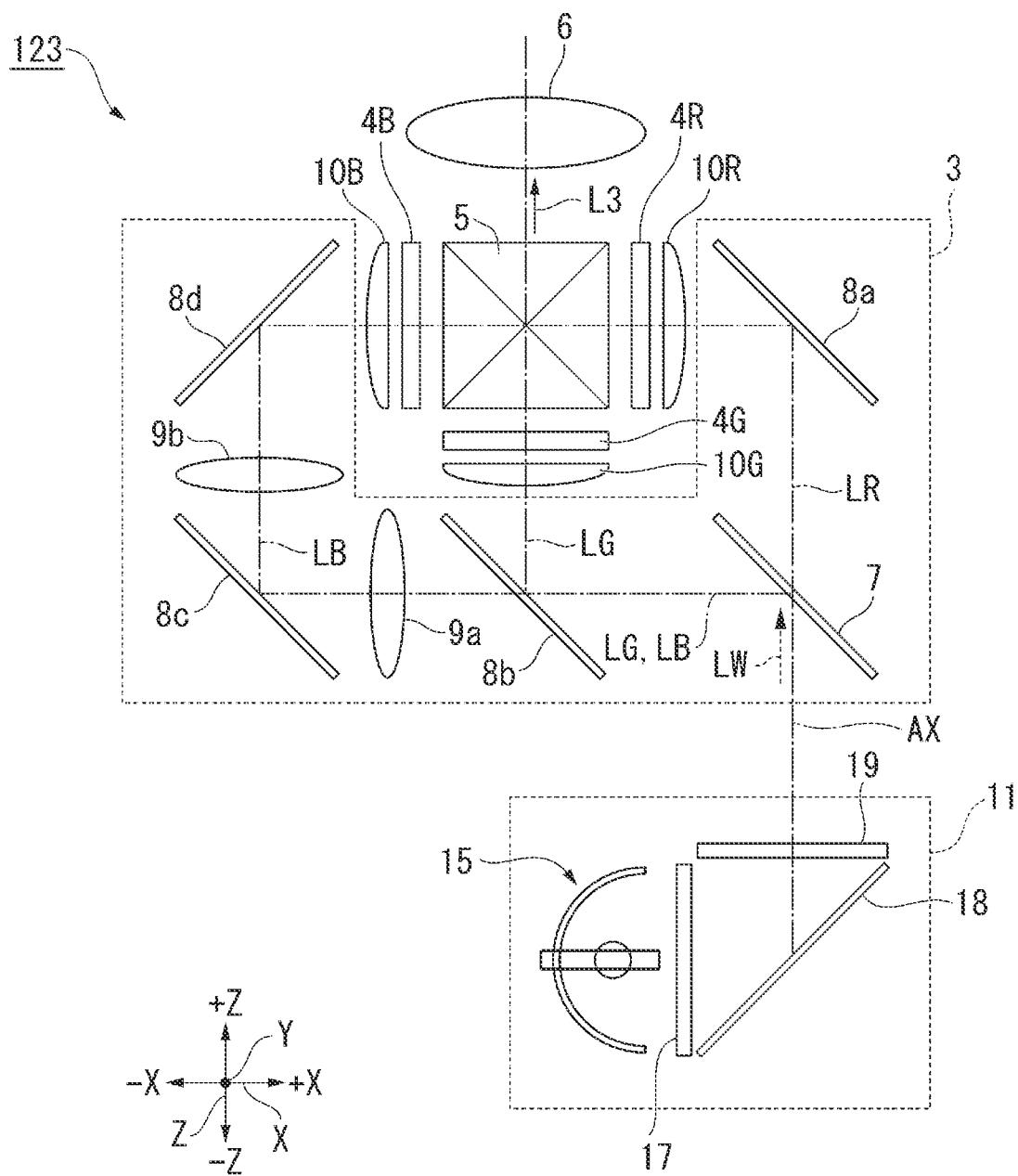
FIG. 13 is a schematic configuration diagram of a third projector of the projection system shown in FIG. 11.

FIG. 13 is a schematic configuration diagram of the third projector 123. As shown in FIG. 13, the third projector 123 includes a light source device 11, a color separation system 3, a light modulation device 4R, a light modulation device 4G, a light modulation device 4B, a light combining system 5, and a projection system 6. The light source device 11 includes a light source 15, lens arrays 17, 19, and a mirror 18. The light source 15 includes e.g. a white lamp outputting white light, but not particularly limited as long as the light source may output white light. In the respective lens arrays 17, 19, fly-eye lenses (not shown) are arranged in a direction orthogonal to an optical axis AX of the white light output from the light source 15. The mirror 18 is placed between the lens array 17 and the lens array 19 on the optical axis AX. The white light output from the light source 15 is output from the light source device 11 as a white light LW having an illuminance distribution homogenized by an integrator including the lens array 17 and the lens array 19.

The color separation system 3 separates the white light LW output from the light source device 11 along the optical axis AX into a red light LR, a green light LG, and a blue light LB. The light modulation device 4R, the light modulation device 4G, and the light modulation device 4B respectively modulate the red light LR, the green light LG, and the blue light LB according to image information and forms image lights in the respective colors. The light combining system 5 combines the image lights in the respective colors output from the light modulation device 4R, the light modulation device 4G, and the light modulation device 4B and generates the third light L3. The projection system 6 projects the third light L3 generated by the light combining system 5.

The color separation system 3 includes a first dichroic mirror 7, a second dichroic mirror 8b, a first reflection mirror 8a, a second reflection mirror 8c, and a third reflection mirror 8d. The first dichroic mirror 7 separates the white light LW output from the light source device 11 into the red light LR and a light as a mixture of the green light LG and the blue light LB and, specifically, transmits the red light LR and reflects the green light LG and the blue light LB. The second dichroic mirror 8b separates the light as the mixture of the green light LG and the blue light LB into the green light LG and the blue light LB and, specifically, reflects the green light LG and transmits the blue light LB. The green light LG reflected by the second dichroic mirror 8b is reflected toward the light modulation device 4G. The first reflection mirror 8a is placed in an optical path of the red light LR and reflects the red light LR transmitted through the first dichroic mirror 7 toward the light modulation device 4R. The second reflection mirror 8c and the third reflection mirror 8d are placed in an optical path of the blue light LB, reflects the blue light LB transmitted through the second dichroic mirror 8b, and guides the blue light LB to the light modulation device 4B.

The light modulation device 4R modulates the red light LR according the image information while passing the red light LR and forms the red image light. Similarly, the light modulation device 4G modulates the green light LG according the image information while passing the green light LG and forms the green image light. The light modulation device 4B modulates the blue light LB according the image information while passing the blue light LB and forms the blue image light. Each of the light modulation device 4R, the light modulation device 4G, and the light modulation device 4B includes e.g. a liquid crystal panel. Polarizers (not shown) are placed at a light incident side and a light exiting side of each of the light modulation device 4R, the light modulation device 4G, and the light modulation device 4B. At the light incident side of the red light LR of the light modulation device 4R, a field lens 10R parallelizing the red light LR entering the light modulation device 4R is provided. At the light incident side of the green light LG of the light modulation device 4G, a field lens 10G parallelizing the green light LG entering the light modulation device 4G is provided. At the light incident side of the blue light LB of the light modulation device 4B, a field lens 10B parallelizing the blue light LB entering the light modulation device 4B is provided.

The light combining system 5 includes e.g. a cross dichroic prism. The light combining system 5 combines the image lights in the respective colors output from the respective light modulation device 4R, light modulation device 4G, and light modulation device 4B and generates the third light L3, and outputs the third light L3 to the +Z side.

The signal processing device 131 of the projection system 103 has the same configuration as the configuration shown in FIG. 8. Note that, in the signal processing device 131 of the projection system 103, a picture signal to the third projector 123 is output from the video card 210. Further, the picture signal to the third projector 123 may be read from outside via the network 201 or a separate network (not shown) or stored in the storage 202 in advance. The distortions of the pictures projected by the first light L31, the first image light L35 and the pictures projected by the second light L32, the second image light L36 are corrected by the picture signals from the signal processing device 131. The picture signals for the distortion correction are processed by software written in the HDD 222.

Figure 14:
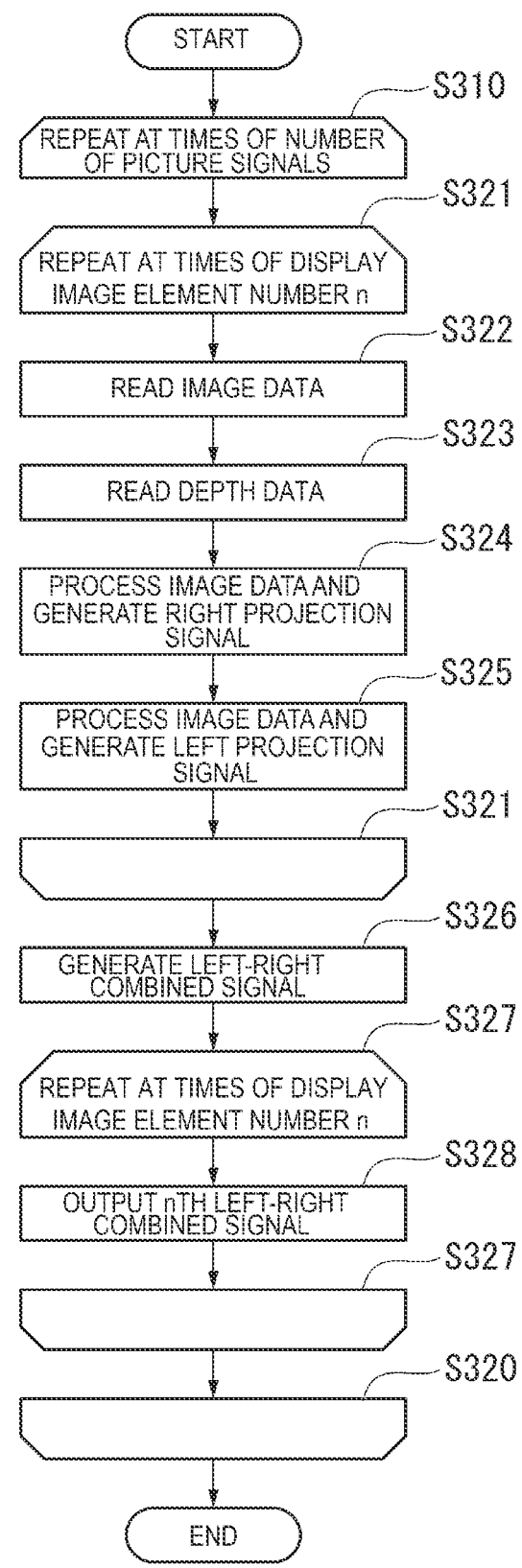
FIG. 14 is a flowchart of an example of processing of picture signals in the projection system shown in FIG. 12.

FIG. 14 is a flowchart of an outline of processing of generating the picture signal input to the third projector 123 of the image projection section 110. As described in the first embodiment, when the number of displayed images is a display image element n, n=1 in the third embodiment. As shown in FIG. 14, first, for n=1, image data and depth data of a first image S to be displayed are read (steps S322, S323). Then, the read image data is processed and combined with the depth data, and the picture signal to be input to the third projector 123 as a right projection signal, i.e., the first light L31 is generated (step S324) and the picture signal to be input to the third projector 123 as a left projection signal, i.e., the second light L32 is generated (step S325). When n is equal to or larger than 2, the generation of the respective right projection signal and left projection signal is repeatedly performed for the display image element n (step S321).

Note that the position where the respective right projection signal and left projection signal in each display image element n including n=1 overlap with each other in the X directions may be calculated from an angle formed by the optical axis of the first light L31 output from the third projector 123 relative to the Z directions and a radiation angle distribution of the first light L31 and an angle formed by the optical axis of the second light L32 relative to the Z directions and a radiation angle distribution of the second light L32. Further, the position where the respective right projection signal and left projection signal overlap with each other in the X directions may be directly calculated from an angle formed by the optical axis of the first image light L35 output from the third projector 123 relative to the Z directions and an angle formed by the optical axis of the second image light L36 output from the third projector 123 relative to the Z directions.

Then, the right projection signal and the left projection signal generated in the above described manner are combined and a left-right combined signal is generated (step S326). Subsequently, the left-right combined signal for n=1 is output to the third projector 123 and output from the third projector 123 toward the fog screen M as the picture signal, i.e., the third light L3 (step S328). When n is equal to or larger than 2, the output of the above described left-right combined signal is repeatedly performed for the display image element n (step S327).

The entire processing of the above described generation steps S321 to S325 of the right projection signal and the left projection signal and generation steps and output steps S326 to S328 of the left-right combined signal is repeated at the times of the number of picture signals, i.e., the number of images (step S320).

In the above described projection system 103 of the third embodiment, like the projection system 101 of the first embodiment, the first light L31, the first image light L35 and the second light L32, the second image light L36 are radiated from the image projection section 110 toward the fog screen M from the two directions different from each other. Therefore, according to the projection system 103 of the third embodiment, the brighter image S than the surrounding fog screen M or the first light L31 or the second light L32 diffused as a single element in the fog screen M may be formed in the region P3 where the first light L31, the first image light L35 and the second light L32, the second image light L36 overlap and the visibility of the pictures may be increased.

Further, in the projection system 103 of the third embodiment, the image projection section 110 has the third projector 123 projecting the third light L3 and the division unit 160 dividing the third light L3 into the first light L31 and the second light L32. According to the projection system 103 of the third embodiment, the third light L3 is formed by combination of the first light L31 at the +X side and the second light L32 at the −X side of the reference axis DX, however, projection is performed in the same manner as that of a case where the third light is divided to the ±X sides by the mirrors 161, 162 of the division unit 160 and the first light L31, the first image light L35 and the second light L32, the second image light L36 are respectively projected from individual projectors, and thereby, the image S may be generated on the fog screen M in the air as is the case of the first embodiment. That is, according to the projection system 103 of the third embodiment, the bright image S is formed on the fog screen M by the single third projector 123, and the visibility may be increased and the space for the whole apparatus may be saved.

Furthermore, the projection system 103 of the third embodiment has the mirror 164 reflecting the first light L31, the first image light L35 divided by the division unit 160 and has the mirror 163 reflecting the second light L32, the second image light L36 divided by the division unit 160. According to the projection system 103 of the third embodiment, the bands of the beams of the first light L31, the first image light L35 and the second light L32, the second image light L36 respectively divided to the ±X sides by the mirrors 162, 161 of the division unit 160 are overlapped in the predetermined region P3 as shown in FIG. 11, and thereby, as is the case of the first embodiment, the image S may be generated in the predetermined region P3 of the fog screen M in the air. Note that, in the projection system 103 of the third embodiment, the mirror 164 reflecting the first light L31, the first image light L35 and the mirror 163 reflecting the second light L32, the second image light L36 are provided. However, only one mirror of the mirror reflecting the first light L31, the first image light L35 and the mirror reflecting the second light L32, the second image light L36 may be provided. Or, the first light L31, the first image light L35 may be reflected by a plurality of mirrors and the second light L32, the second image light L36 may be reflected by a plurality of mirrors.

In the above described projection system 103, when the overlap between the image S and the third projector 123 in the X directions is acceptable, a relative range of a radiation angle at which the first image light L35 exists in the first light L31 and a relative range of a radiation angle at which the second image light L36 in the second light L32 may be symmetrical to each other. Further, in the above described projection system 103, the projected image exists only in the first image light L35 of the range of the radiation angle of the first light L31, however, the projected images may exist in two ranges within the range of the radiation angle like the first embodiment. In this case, the projected images may exist in two ranges within the range of the radiation angle of the second light L32 correspondingly to the range of the radiation angle in which the projected images exist in the first light L31. According to the configuration, another image than the image S may be formed on the fog screen M. Note that, in this case, it is preferable that the respective two image lights contained in the first light L31 and the respective second lights L32 corresponding to the respective two image lights are alternately switched with a predetermined time period and projected as described in the first embodiment. Therefore, unexpected formation of an image other than the desired image S and the other image is avoided.

Though not shown in the drawings, the projection system 103 of the third embodiment may include the transparent box 144 like the projection system 102 of the second embodiment. The transparent box 144 is provided, and thereby, in the projection system 103, the image S is formed in the predetermined region P3 of the fog screen M that fills the interior of the transparent box 144. In the projection system 103 including the transparent box 144, the amount of generated fog may be suppressed to nearly the same as the capacity of the transparent box 144 and use efficiency of the generated fog may be increased, influences on the image S by wind, environmental factors, or the like may be avoided, and lowering of the degree of visibility of the image S may be suppressed. Note that, when the projection system 103 includes the transparent box 144, the shape of the transparent box 144 is not limited to the rectangular parallelepiped shape, but can be appropriately set to a spherical shape or the like according to the way of showing the image S and the relative position of the observer to the fog screen M.

The schematic configuration of the third projector 123 of the projection system 103 of the third embodiment explained with reference to FIG. 13 may be applied to the respective configurations of the first projectors 111 and the second projectors 112 of the projection system 101 of the first embodiment and the projection system 102 of the second embodiment.

Fourth Embodiment

Next, a projection system of a fourth embodiment of the present disclosure will be explained using FIG. 15.

In a projection system 104 of the fourth embodiment, the configurations in common with the projection system 101 of the first embodiment have the same signs as those of the configurations of the projection system 101 and the explanation thereof will be omitted.

Figure 15:
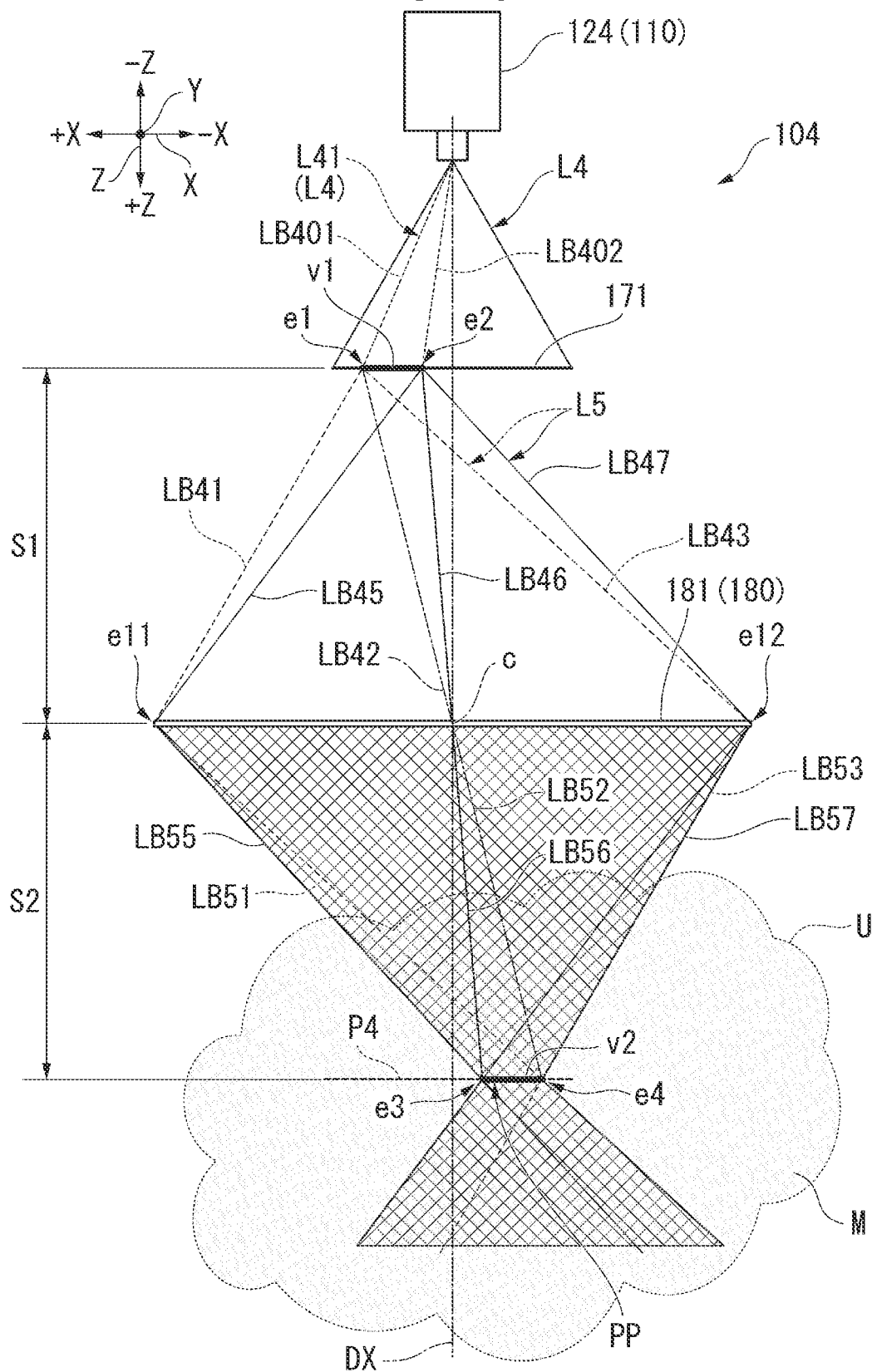
FIG. 15 is a schematic configuration diagram of a projection system of a fourth embodiment.

FIG. 15 is a plan view of the projection system 104 of the fourth embodiment. As shown in FIG. 15, the projection system 104 includes the image projection section 110 having a fourth projector 124, a sub-screen 171, an image generation section 180, the fog screen production section 141, the installation base 125, and the signal processing device 131. Note that, in FIG. 15, the fog screen production section 141, the installation base 125, the installation surface 128, and the signal processing device 131 are omitted. As shown in FIG. 15, in the projection system 104, the image projection section 110 has the single fourth projector 124. The fourth projector 124 projects a fourth image light (image light) L4. For example, the configuration of the fourth projector 124 is the same as the configuration of the third projector 123 described in the third embodiment, however, not particularly limited as long as the configuration can project the fourth image light L4. In the projection system 104, the reference axis DX passes through the center in the X directions of the fourth projector 124 and is parallel to the Z directions.

The sub-screen 171 is placed at the +Z side of the exit opening from which the fourth image light L4 is output in the fourth projector 124 and extends along the X directions crossing the reference axis DX. The optical axis of the fourth image light L4 overlaps with the reference axis DX. In the projection system 104, of the range of the radiation angle of the fourth image light L4, the image, i.e., the projected image exists only in a fourth image light L41 within a range between a beam LB401 connecting the exit opening of the fourth projector 124 and an end point e1 on the sub-screen 171 and a beam LB402 connecting the exit opening of the fourth projector 124 and an end point e2 on the sub-screen 171. Accordingly, a picture signal for generation of an image v1 is projected in the range between the end points e1, e2 of the sub-screen 171 by the fourth image light (image light) L41 and the image v1 (first image) is formed between the end points e1, e2 of the sub-screen 171. In the region U containing a predetermined region P4, the fog screen M is produced by the fog generation device 142 of the fog screen production section 141 (not shown).

The image generation section 180 is placed at the +Z side of the sub-screen 171 on the optical axis of the fourth image light L4, i.e., the reference axis DX. The image generation section 180 collects a fifth image light (image light output from the first image) L5 output from the image v1 to a region PP between an end point e3 and an end point e4 of the predetermined region P4 in the Z directions. The sub-screen 171 has diffusion characteristics such that the fifth image light L5 may enter the position of the image generation section 180 placed at the +Z side. The image generation section 180 includes e.g. a Fresnel lens 181 that functions like a refractive convex lens.

When the focal length of the Fresnel lens 181 is f and a distance from the sub-screen 171 to the Fresnel lens 181 in the Z directions is S1, the image v1 projected between the end points e1, e2 of the sub-screen 171 is focused on a space at a distance $S2=1/\{(1/f)-(1/S1)\}$ from the Fresnel lens 181 to the +Z side in the Z direction, i.e., the predetermined region P4 in a size at (S2/S1) times. In this regard, diffused beams LB41, LB42, LB43 output from the end point e1 of the image v1 respectively pass through an end point e11 at the +X side of the Fresnel lens 181, a center c of the Fresnel lens 181, and an end point e12 at the −X side of the Fresnel lens 181 and are collected to the end point e4 of the region PP as focused beams LB51, LB52, LB53, respectively. Further, diffused beams LB45, LB46, LB47 output from the end point e2 of the image v1 respectively pass through the end point e11 at the +X side of the Fresnel lens 181, the center c of the Fresnel lens 181, and the end point e12 at the −X side of the Fresnel lens 181 and are collected to the end point e3 of the region PP as focused beams LB55, LB56, LB57, respectively. An image v2 as a second image is formed in the region PP by the fifth image light L5 output from the image v1 having the fifth image light L5 containing the diffused beams LB41 to LB43 and the fifth image light L5 containing the diffused beams LB45 to LB47.

The signal processing device 131 of the projection system 104 has the same configuration as the configuration shown in FIG. 8. Note that, in the signal processing device 131 of the projection system 104, a picture signal to the fourth projector 124 is output from the video card 210. Further, the picture signal to the fourth projector 124 may be read from outside via the network 201 or a separate network (not shown) or stored in the storage 202 in advance. The distortions of the pictures projected by the fourth image lights L4, L41 are corrected by the picture signals from the signal processing device 131 as needed. The picture signals for the distortion correction are processed by software written in the HDD 222.

In the projection system 104, as exemplified in FIG. 15, the sub-screen 171 is formed in parallel in the X directions and flat, and the image v2 is formed in parallel in the X directions and flat. Note that the sub-screen 171 may have an uneven shape or a curved shape with respect to the X directions and, in this case, the image v2 has an uneven shape or a curved shape with respect to the X directions. As described above, distortion correction in consideration of the shape of the sub-screen 171 may be performed on the picture signal output from the signal processing device 131 to the fourth projector 124.

In the projection system 104, processing of generating the picture signal input to the fourth projector 124 of the image projection section 110 is basically the same as the processing described with reference to FIG. 14 in the third embodiment. Note that, in the processing in the projection system 104, for n=1, image data and depth data of a first image S to be displayed may be read (steps S322, S323), the read image data may be processed and combined with the depth data, and the picture signal to be input to the fourth projector 124 may be generated as the fourth image light L4. That is, in the processing in the projection system 104, the respective right projection signal, left projection signal, and left-right projection signal of the signals in the processing of generating the picture signal in the projection system 103 may be replaced by the picture signals of the fourth image light L4.

The above described projection system 104 of the fourth embodiment includes the fourth projector 124 projecting the fourth image lights L4, L41, the sub-screen 171 on which the image v1 is projected by the fourth image lights L4, L41, the image generation section 180 collecting the fifth image light L5 output from the image v1 in the predetermined region PP, and the fog screen production section 141 producing the fog screen M in which the plurality of particles a that can reflect the fifth image light L5 output from the image v1 in the region (screen region) U containing the predetermined region PP are dispersed. In the projection system 104 of the fourth embodiment, the image formed in the predetermined region PP in the air, i.e., within the fog screen M is visually recognized only from the traveling directions of the respective beams of the fifth image light L5 without fog, however, when fog exists, the image is diffused and observable from any direction. In the meshed region in FIG. 15, the beams forming the fifth image light L5 exist and are diffused by the fog screen M, however, the beams forming the fifth image light L5 are focused in the predetermined region PP and the image v2 in the predetermined region PP appears brighter than its surroundings. Therefore, according to the projection system 104 of the fourth embodiment, the brighter image v2 than the surrounding fog screen M or the fifth image light L5 diffused as a single element in the fog screen M in the predetermined region PP where the fifth image light L5 is focused may be formed. Further, according to the projection system 104 of the fourth embodiment, the fifth image light L5 is not imaged at the ±Z sides of the predetermined region P4 in the Z directions and the image v2 is blurred or not visually recognizable, however, the fifth image light L5 is imaged in the predetermined region P4 with higher accuracy and the resolution of the image v2 is the highest, and visibility of the picture by the image v2 may be increased.

In the projection system 104 of the fourth embodiment, the Fresnel lens 181 is used as the image generation section 180, and thereby, the sizes of the image generation section 180 and the entire apparatus in the Z directions may be suppressed. For the image generation section 180, a multi-level zone plate having the same function as the Fresnel lens 181 and having a refractive index profile as an approximation of the refractive index profile of the Fresnel lens 181 in a stepwise pattern may be used.

Note that, in the above described projection system 104, the projected image exists only in the fourth image light L41 of the range of the radiation angle of the fourth image light L4, however, the projected images may exist only in two ranges within the range of the radiation angle like the first embodiment. According to the configuration, another image than the image v2 may be formed on the fog screen M. Note that, in this case, it is preferable that the respective two image lights contained in the fourth image light L4 are alternately switched with a predetermined time period and projected as described in the first embodiment. Therefore, unexpected formation of an image other than the desired image v2 and the other image is avoided.

Though not shown in the drawings, the projection system 104 of the fourth embodiment may include the transparent box 144 like the projection system 102 of the second embodiment. The transparent box 144 is provided, and thereby, in the projection system 104, the image v2 is formed in the predetermined region PP of the fog screen M that fills the interior of the transparent box 144. In the projection system 104 including the transparent box 144, the amount of generated fog may be suppressed to nearly the same as the capacity of the transparent box 144 and use efficiency of the generated fog may be increased, influences on the image v2 by wind, environmental factors, or the like may be avoided, and lowering of the degree of visibility of the image v2 may be suppressed. Note that, when the projection system 104 includes the transparent box 144, the shape of the transparent box 144 is not limited to the rectangular parallelepiped shape, but can be appropriately set to a spherical shape or the like according to the way of showing the image v2 and the relative position of the observer to the fog screen M.

As above, the preferred embodiments of the present disclosure are described in detail. The present disclosure is not limited to the particular embodiments according to the present disclosure, but various modifications and alterations can be made without departing of the scope of the present disclosure described in Claims. Further, the component elements of the embodiments can be appropriately combined.

For example, in the above described respective embodiments, the cases where the number of displayed images, i.e., the display image element n is 1 or 2 are exemplified for explanation, however, the display image element n may be 3 or more. In the projection systems of the respective embodiments, the picture signals according to the display image element n are output from the signal processing devices 131 to the image projection sections projecting the predetermined image lights.

Further, the configuration of the projection system according to the present disclosure can be applied as an aerial image forming apparatus forming an aerial image in the air in which the fog screen M is produced.

The projection system according to aspects of the present disclosure may have the following configurations.

A projection system according to an aspect of the present disclosure includes an image projection section projecting a first light containing a first image light and a second light containing a second image light from directions different from each other, and a fog screen production section producing a fog screen in which a plurality of particles that can reflect the first light and the second light are dispersed in a screen region containing a predetermined region, wherein the image projection section projects the first light and the second light so that the first image light and the second image light overlap in a predetermined first region.

In the projection system according to the aspect of the present disclosure, the image projection section may have a first projection unit projecting the first image light, and a second projection unit projecting the second image light.

In the projection system according to the aspect of the present disclosure, the image projection section may have a projection unit projecting a projection light, and a division unit dividing the projection light into the first image light and the second image light.

The projection system according to the aspect of the present disclosure may further include a first reflection portion reflecting the first image light divided by the division unit.

The projection system according to the aspect of the present disclosure may further include a second reflection portion reflecting the second image light divided by the division unit.

In the projection system according to the aspect of the present disclosure, the first light may contain a third image light, the second light may contain a fourth image light, the image projection section may project the first light and the second light so that the third image light and the fourth image light overlap in a predetermined second region, and a position of the first region and a position of the second region may be different.

In the projection system according to the aspect of the present disclosure, the image projection section may project the first light and the second light so that a size of an image formed in the first region and a size of an image formed in the second region are different.

In the projection system according to the aspect of the present disclosure, the image projection section may project the first light and the second light so that a distance between the first region and the image projection section and a distance between the second region and the image projection section are different.

The projection system according to the aspect of the present disclosure may further include a control section controlling the image projection section, wherein the control section may control the image projection section to turn off the third image light and the fourth image light when the first image light and the second image light are on, and turn off the first image light and the second image light when the third image light and the fourth image light are on.

A projection system according to an aspect of the present disclosure includes an image projection section projecting an image light, a sub-screen on which a first image is projected by the image light, an image generation section collecting the image light output from the first image in a predetermined region, and a fog screen production section generating a fog screen in which a plurality of particles that can reflect the image light output from the first image are dispersed in a screen region containing the predetermined region.

What is claimed is:

1. A projection system comprising:
    an at least one image projector projecting a first light containing a first image light and a second light containing a second image light to directions different from each other; and
    a fog screen fog generator producing a fog screen in which a plurality of particles that reflect the first light and the second light are dispersed in a screen region containing a first region; and
    a controller controlling the at least one image projector, wherein
    the first image light overlaps the second image light in the first region,
    the first light contains a third image light,
    the second light contains a fourth image light,
    the third image light overlaps the fourth image light in a second region included in the screen region,
    a position of the first region and a position of the second region are different from each other, and
    the controller controls the at least one image projector so that the at least one image projector does not project the third image light and the fourth image light when the at least one image projector projects the first image light and the second image light, and the at least one image projector does not project the first image light and the second image light when the at least one image projector projects the third image light and the fourth image light.

2. The projection system according to claim 1, wherein the at least one image projector has:
    a first projector projecting the first light; and
    a second projector projecting the second light.

3. The projection system according to claim 1, wherein the at least one image projector has:
    at least one projector projecting a projection light; and
    a plurality of division mirrors dividing the projection light into the first light and the second light.

4. The projection system according to claim 3, further comprising a first reflection portion reflecting the first light divided by the plurality of division mirrors.

5. The projection system according to claim 3, further comprising a second reflection portion reflecting the second light divided by the plurality of division mirrors.

6. The projection system according to claim 1, wherein a size of an image projected by the at least one image projector and formed in the first region and a size of an image projected by the at least one image projector and formed in the second region are different from each other.

7. The projection system according to claim 1, wherein a distance between the first region and the at least one image projector and a distance between the second region and the at least one image projector are different from each other.

8. A projection system comprising:
    at least one image projector projecting an image light;
    a sub-screen on which a first image is projected by the image light;
    an image generation lens collecting an image light output from the first image in a first region; and
    a fog screen fog generator producing a fog screen in which a plurality of particles that reflect the image light output from the first image are dispersed in a screen region containing the first region.

9. The projection system according to claim 8 wherein the at least one image projector has:
    at least one projector projecting a projection light; and
    a plurality of division mirrors dividing the projection light into the first light and the second light.

10. The projection system according to claim 9, further comprising a first reflection portion reflecting the first light divided by the plurality of division mirrors.

11. The projection system according to claim 9, further comprising a second reflection portion reflecting the second light divided by the plurality of division mirrors.

* * * * *